US009053246B2

(12) United States Patent
Moore (10) Patent No.: US 9,053,246 B2
(45) Date of Patent: Jun. 9, 2015

(54) USB CLASS PROTOCOL MODULES (71) Applicant: MCCI Corporation, Ithaca, NY (US)

(72) Inventor: Terrill M. Moore, Trumansburg, NY (US)

(73) Assignee: MCCI Corporation, Ithaca, NY (US)

( * ) Notice: Subject to any disclaimer, the term of this patent is extended or adjusted under 35 U.S.C. 154(b) by 234 days.

(21) Appl. No.: 13/678,791

(22) Filed: Nov. 16, 2012

(65) Prior Publication Data

US 2013/0138860 A1 May 30, 2013

Related U.S. Application Data (60) Provisional application No. 61/561,107, filed on Nov. 17, 2011.

(51) Int. Cl.
| | |
|---|---|
| *G06F 13/40* | (2006.01) |
| *G06F 13/28* | (2006.01) |
| *G06F 13/362* | (2006.01) |
| *G06F 13/42* | (2006.01) |
| *G06F 13/24* | (2006.01) |
| *G06F 13/32* | (2006.01) |

(52) U.S. Cl.
CPC .......... G06F 13/4027 (2013.01); *G06F 13/24* (2013.01); G06F 13/28 (2013.01); *G06F 13/32* (2013.01); G06F 13/362 (2013.01); G06F 13/4221 (2013.01); G06F 13/4282 (2013.01); *G06F 2213/0042* (2013.01)

(58) Field of Classification Search
CPC ......... G06F 13/24; G06F 13/28; G06F 13/32; G06F 13/362; G06F 13/4027; G06F 13/4221; G06F 13/4282; G06F 2213/0042

USPC ......................................................... 710/313
See application file for complete search history.

(56) References Cited

U.S. PATENT DOCUMENTS

| | | | | |
|---|---|---|---|---|
| 6,636,929 | B1 * | 10/2003 | Frantz et al. .................. | 710/313 |
| 7,409,476 | B1 * | 8/2008 | Liang et al. .................... | 710/52 |
| 7,478,180 | B1 * | 1/2009 | Li ................................... | 710/62 |
| 7,660,937 | B2 * | 2/2010 | Frantz et al. .................. | 710/313 |
| 7,676,605 | B1 * | 3/2010 | Citterelle et al. ................ | 710/5 |
| 7,757,073 | B2 * | 7/2010 | Huang et al. ..................... | 713/1 |
| 8,266,395 | B2 * | 9/2012 | Li ................................. | 711/156 |
| 8,521,934 | B1 * | 8/2013 | Ni ................................. | 710/113 |
| 2006/0190238 | A1 * | 8/2006 | Autor et al. ..................... | 703/25 |
| 2007/0005867 | A1 * | 1/2007 | Diamant ....................... | 710/306 |
| 2007/0044100 | A1 * | 2/2007 | Panesar et al. ................ | 718/102 |
| 2008/0005446 | A1 * | 1/2008 | Frantz et al. .................. | 710/313 |

(Continued)

OTHER PUBLICATIONS

"eXtensible Host Controller Interface for Universal Serial Bus (xHCI)"; Intel Corporation; Revision 1.0; May 21, 2010; all pages.*

(Continued)

*Primary Examiner* — Ryan Stiglic
(74) *Attorney, Agent, or Firm* — Cesari and McKenna, LLP (57) ABSTRACT A computer system includes USB class protocol-aware modules for USB devices as part of a xHCI host controller. The protocol-aware modules serve as accelerators by implementing critical portions of the device class protocols, which includes fetching higher level protocol data directly from client buffers for transmission and delivering decoded data to client buffers on receipt; and emulating a register-based interface for the benefit of system software on the host computer.

20 Claims, 8 Drawing Sheets

(56) References Cited

U.S. PATENT DOCUMENTS

2008/0071962 A1* 3/2008 Yang et al. .................... 710/313
2008/0235757 A1* 9/2008 Li ..................................... 726/1
2009/0204965 A1* 8/2009 Tanaka et al. ..................... 718/1
2012/0166687 A1* 6/2012 Baker ............................. 710/49
2012/0166692 A1* 6/2012 Wang et al. ................... 710/105

OTHER PUBLICATIONS

"Universal Serial Bus 3.0 Specification"; Hewlett-Packard et al.; Revision 1.0; Nov. 12, 2008; all pages.*

* cited by examiner

PRIOR ART

FIG. 4

PRIOR ART

USB CLASS PROTOCOL MODULES

CROSS-REFERENCE TO RELATED APPLICATIONS

The present application claims the benefit of U.S. Provisional Patent Application Ser. No. 61/561,107, which was filed on Nov. 17, 2011, by Terrill M. Moore for a USB CLASS PROTOCOL MODULES and is hereby incorporated by reference.

BACKGROUND OF THE INVENTION

1. Field of the Invention

The invention relates generally to computer systems and, more particularly, to computer systems that utilize the SuperSpeed USB Universal Serial Bus.

2. Background Information

Computer systems are normally composed of one or more central processing units (CPUs), a memory system, and a system bus, which is used for connecting peripherals of various kinds to the system. A PCIe bus or variants thereof have served as the system bus. Traditional system busses are register-oriented rather than message oriented. The busses have performance benefits, but also cause certain problems for power management and battery-powered systems.

The SuperSpeed USB Universal Serial Bus ("USB"), USB 3.0, is fast enough to allow use as a system bus. Further, with the introduction of new class protocols such as Network Control Model (for gigabit Ethernet), Audio Video Class (for external display), and USB Attached SCSI (for mass storage), the higher level signaling protocols of USB have the capability to deliver very good performance, while also providing superior power management. In addition, the system cost can be reduced by eliminating the PCIe bus, which becomes unnecessary. The xHCI host controller architecture streamlines the delivery of USB data from class drivers to the USB, by presenting the semantics of a "USB Transfer" directly to the system software.

There remains one roadblock. With current USB 3.0 host controllers based on the "xHCI" architecture, the operating system software must translate the low-level protocol offered by the "xHCI" host controller into the higher level protocols required by the system devices. This overhead, which is not needed for PCIe and other register-based bus architectures, can result in reduced throughput and increased power usage. In addition, higher level protocol data must be encapsulated by software into USB data transfers for transmission, and the encapsulated data must be decoded upon receipt. The encoding and/or decoding generally entails extra copying of data, or a high level of complexity in system software. With limited exceptions, the xHCI architecture is not able to accelerate data transfer in a class-specific way. Accordingly, system software still must, in effect, perform marshaling and demarshaling. This extra work wastes CPU time and battery power, and reduces the effectiveness of USB 3.0 if used as a system bus, especially in a virtual machine environment.

SUMMARY OF THE INVENTION

This invention solves the problems discussed above by including protocol-aware modules for USB devices as part of the xHCI host controller. These protocol-aware modules serve as accelerators by implementing critical portions of the device class protocols, which includes fetching higher level protocol data directly from client buffers for transmission and delivering decoded data to client buffers on receipt; and emulating a register-based interface for the benefit of system software on the host computer.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
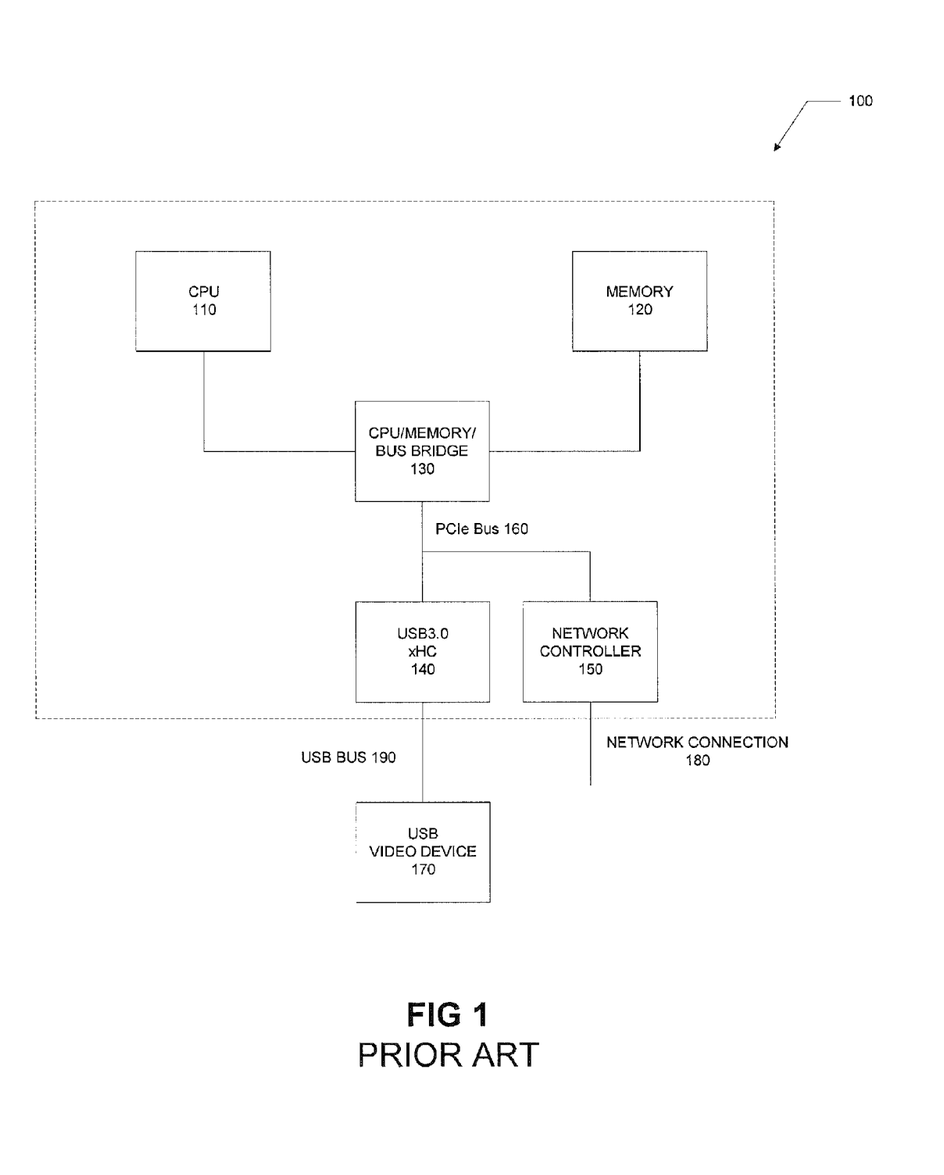
FIG. 1 is a functional block diagram of a prior system that incorporates a conventional xHC controller.

Referring to FIG. 1, a computer 100 operates in a well known manner as host of a USB 3.0 bus 190. A central processing unit (CPU) 110 is coupled to a CPU/memory/bus bridge 130 which is, in turn, coupled to a memory 120. The CPU/memory/bus bridge 130 is further coupled via a PCIe bus 160 to a USB 3.0 xHCI host controller 140 and a network controller 150. The USB 3.0 xHCI host controller 140 controls communications and data transfers over the USB 3.0 bus 190 between the host, or more specifically, the memory 120 and one or more USB devices 170 (only one shown) that may be removably attached to the USB 3.0 190 from time to time. As an example, the USB device 170 may be a USB video device. The network controller 150 operating in a known manner may be coupled to an appropriate network connection 180, and data may be transferred to and from the network in a known manner.

For convenience, the USB 3.0 190 will be referred to hereinafter as "the USB 190," and the USB 3.0 xHCI host controller 140 will be referred to as the "xHCI host controller 140."

Figure 2:
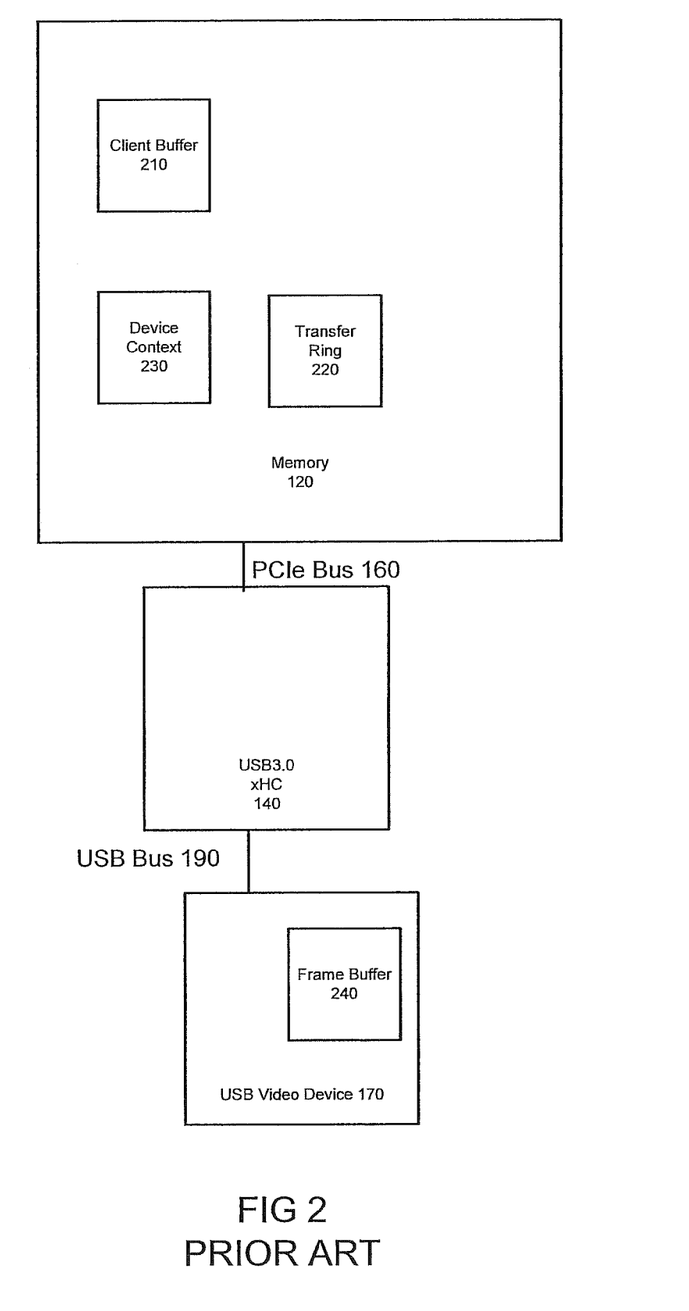
FIG. 2 is a functional block diagram showing further details of FIG. 1.

Referring now also to FIG. 2, the memory 120 contains several data structures utilized for the communications and data transfers over the USB 190. A device context data structure 230 holds device configuration and state information associated with an attached device, in the example, the USB video device 170. A client buffer 210, which is a region of the memory 120, is used for the source or destination of a data transfer with the USB video device 170. Transfers to and from the USB 190 are directed by transfer rings 220, which include one transfer ring per active pipe and hold state describing data transfers in progress between the xHCI host controller 140 and the USB device 170.

The USB device 170 includes a frame buffer 240. In the example, the USB device 170 is a video device, and the frame buffer 240 holds pixel data that are to be displayed on an associated display mechanism (not shown). The pixel data are received from the host 100 over the USB 190.

As is well known, before transferring data over the USB 190, which is a message-oriented bus, the xHCI host controller 140 utilizes computer operating system resources to manipulate the data in accordance with lower level protocols associated with the xHCI architecture, and further, to encapsulate the manipulated data into messages for transfer.

Figure 3:
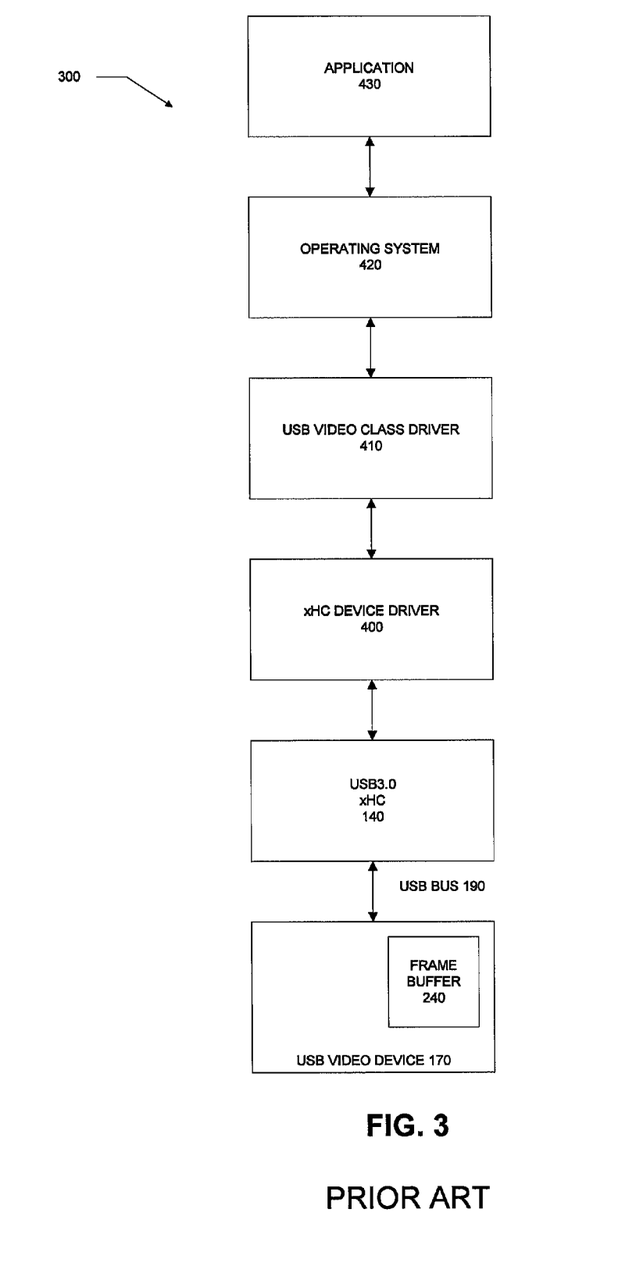
FIG. 3 is a functional block diagram of a protocol stack for use in the system of FIG. 1 with a peripheral device attached to the USB.

Referring now also to FIG. 3, a device protocol stack 300 includes respective layers involved in transferring data from the host computer 100 to the USB video device 170 over the USB 190 in the well known manner. The user application 430 runs on the computer 100 in communication with the computer operating system 420. Data to be provided from the user application program on the host 100 to the USB video device 170 for display are first manipulated by a USB video class driver 410 to provide formatted data in accordance with the higher level protocol utilized by the particular USB video device 170. Because of the nature of the protocol involved, the USB video class driver 410 maintains a virtual frame buffer in system memory. Changes in the frame buffer are then forwarded to the USB video device 170 using the commands of the USB AV Class Protocol. The manipulated data are thereafter further manipulated by an xHC device driver 400 in accordance with the lower level protocol utilized by the xHCI architecture. The xHCI host controller 140 also controls the encapsulation and transfer of the data over the USB 190 to the USB video device 170. The stack 300 makes use of the client buffer 210 and the transfer ring 220 in the known manner. As is understood, the stack layers or components may be hardware, software, firmware or combinations thereof.

The USB device 170 includes a device controller 244 that decodes the received data transfer and provides the data to the frame buffer 240 and an adaptor 245 that utilizes the data. In the example, the adaptor 245 operates to provide the data for display.

Figure 4:
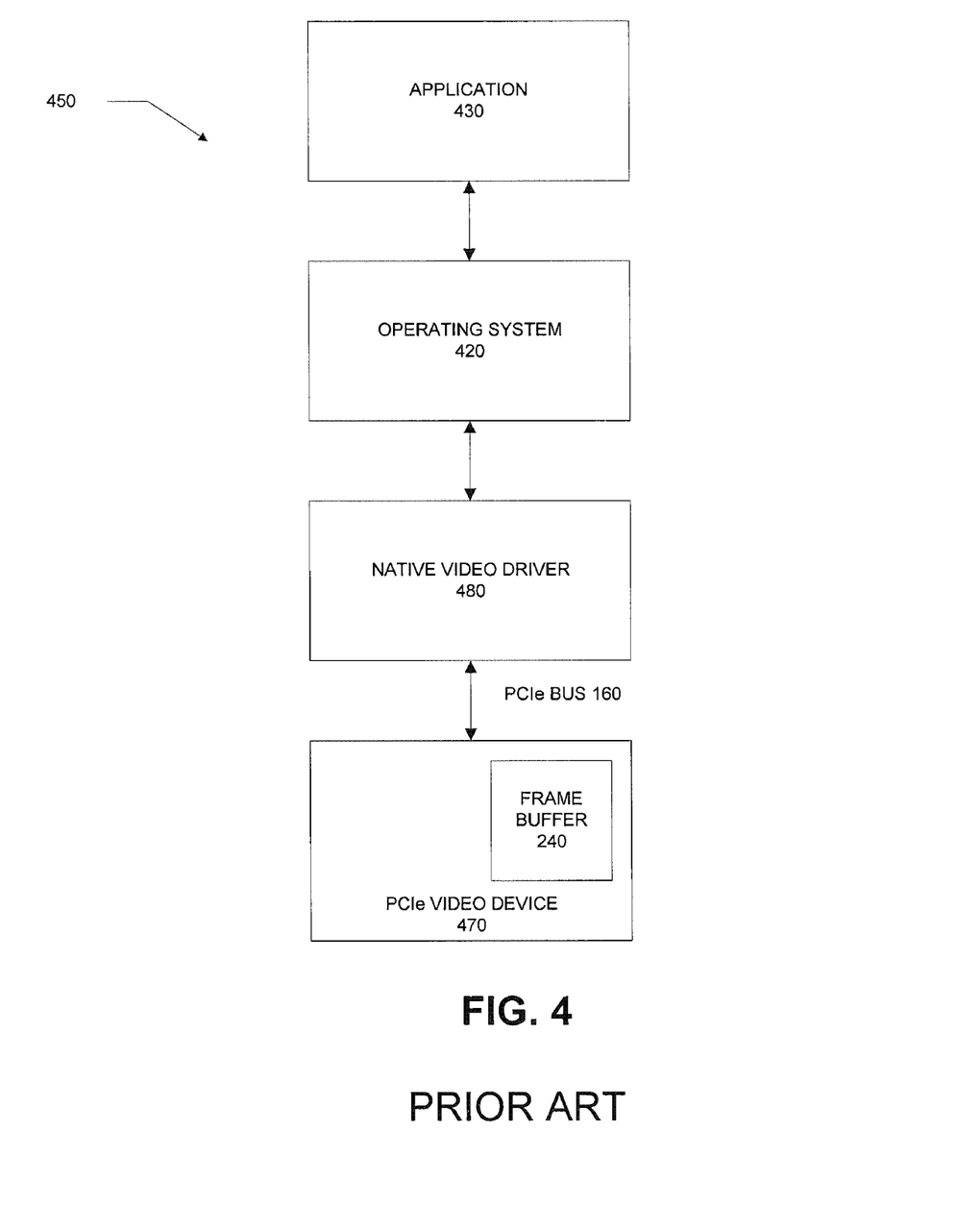
FIG. 4 is a functional block diagram of a protocol stack for use in the system of FIG. 1 with a peripheral device attached to the ePCI bus.

In contrast, data transfers to a device over the PCIe bus 160, which is a register-oriented bus, utilize a protocol stack 450, as illustrated in FIG. 4, in which an application 430 operates with the host operating system 420 to provide data for display by the PCIe video device 470. A native video driver 480 formats the data for use by the PCIe video device by sending commands directly to the associated registers (not shown) of the PCIe Video device 470, and the formatted data are provided over the PCIe bus from the host memory all in a known manner. The data transfers over the PCIe bus do not require use of the computer operating system resources to further manipulate the data in accordance with lower level xHCI protocols and/or to encapsulate the data into messages for transfer. Furthermore, the frame buffer is directly updated according to the instructions from the video driver, and there is no need for the driver to create special command sequences for xHCI. Accordingly, data transfers over the PCIe bus can occur without the processing delays associated with such data manipulation.

Figure 5:
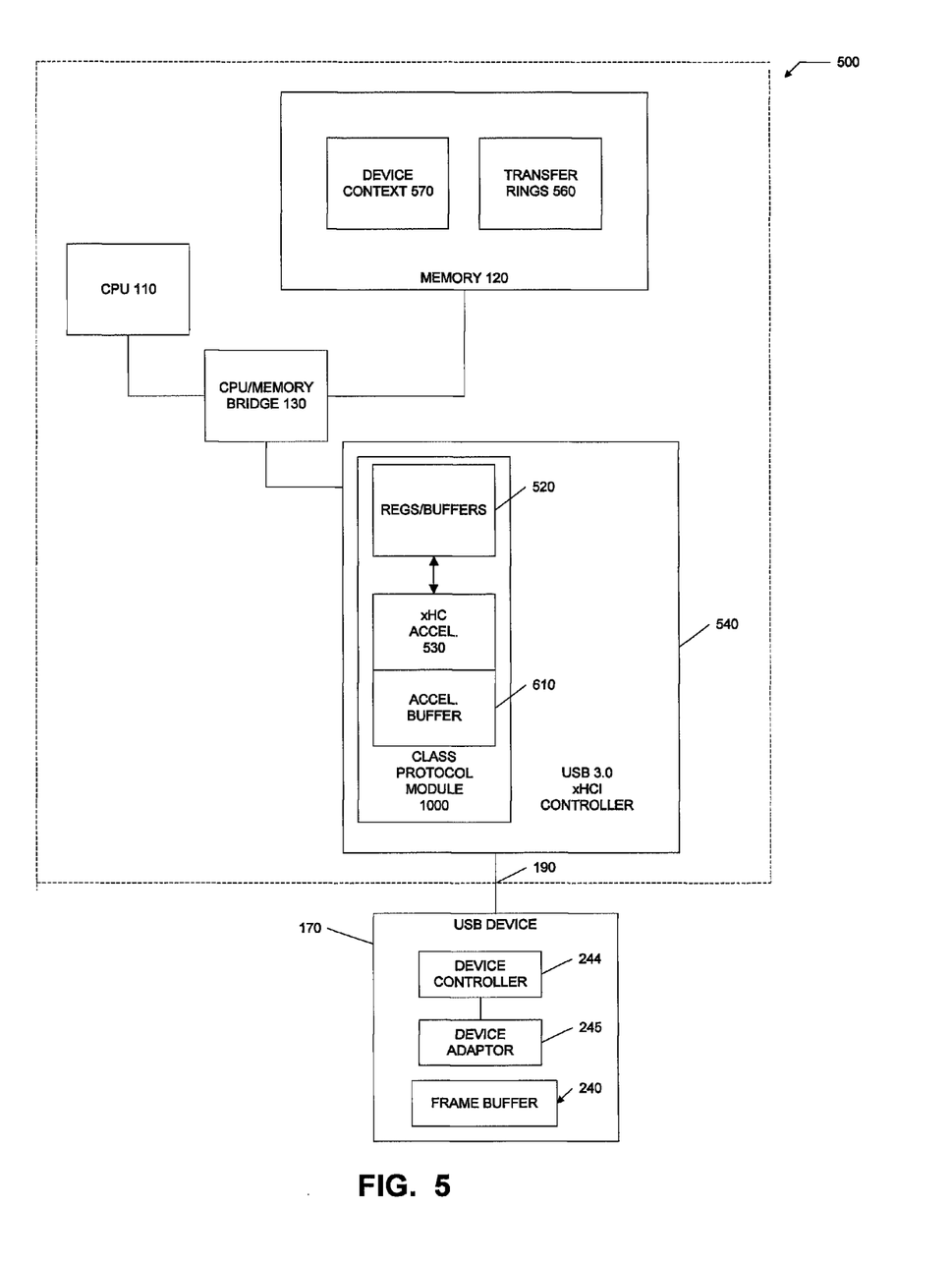
FIG. 5 is a functional block diagram of a system constructed in accordance with the invention.

Referring now to FIG. 5, the transfer of data over the USB 190 between a host 500 and a USB device 170 can be performed more efficiently by an xHCI host controller 540, which utilizes one or more class protocol-aware modules 1000 (only one shown). The class protocol-aware modules (hereinafter "Protocol Modules") emulate, from the point of view of an associated class driver on the host, a familiar register-like interface. The class driver can then operate efficiently to perform tasks as if commands and data transfers are communicated directly to registers and buffers on the device through the interface. This eliminates the need to translate the tasks, in software, into API calls to an associated USB device driver.

The Protocol Modules reside in the xHCI host controller 540 and are discovered by the system while initializing the xHCI host controller 540. The Protocol Modules remain dormant until the system enumerates an appropriate USB device and determines that the device supports a USB class protocol that can be accelerated by an available Protocol Module. The host 500 then sends an enabling command to bind the corresponding Protocol Module to an associated device instance.

The system re-directs a transfer ring mechanism (not shown) that is associated with the device instance as part of xHC enumeration to utilize associated transfer rings 560 that are operating in conjunction with a device context 570, to send data to or receive data from connections on the corresponding Protocol Module 1000. The transfer rings 560, in turn, direct the data to and from the USB 190 under the control of the xHCI controller 540. The transfer ring format of the USB 3.0 specification can thus be reused for simple protocols or extended for protocols that require additional information or specialized data formats. The Protocol Module, in effect, establishes a register set or semantic model that is optimized for the application 430 (FIG. 4), and processes the data for transfer over the USB 190. The xHCI host controller 540 then transfers the data provided via the Protocol Module 1000 between USB end points associated with the respective devices, utilizing the pipes and so forth established in a known manner during the enumeration of the USB video device 170.

The Protocol Module 1000 uses a set of registers and buffers 520 to provide to a native class driver 480 a register-like interface model that allows the class driver to provide data for transfer to the device as if the device driver has I/O paths through the interface to the USB device 170. The Protocol Module emulates a device controller and processes the data in accordance with the commands from the class driver and the corresponding class protocol, and thus, adds appropriate headers and so forth. In addition, the Protocol Module operates in conjunction with the xHC device driver and formats the processed data for transfer as messages to the device over the USB by the xHCI controller. When the USB device receives the data transfer, the device utilizes the data in the manner described above with reference to FIG. 3.

The Protocol Module 1000, in the example, corresponds to the AV USB class. The Protocol Module includes an xHC video accelerator 530 and associated video registers and frame buffer 520 that emulate a register-like interface for performing tasks directed to the frame buffer 240 of the USB video display device 170. The Protocol Module is thus a special purpose module that performs formatting and decoding operations in hardware or firmware, which results in reduced power consumption and increased throughput.

The operations of the Protocol Module are first explained generally and then in more detail by way of the AV class example.

In the example of video display over the USB 190, one of the issues is detecting what portions of the frame buffer have been updated, so that only the updates are transmitted over the bus. The AV class Protocol Module 1000 presents, as the semantic model, a frame buffer and a virtual or physical graphical processing unit to the traditional operating system 420 and/or native device driver 480 (FIG. 4) for a typical video device video controller (not shown). The operating system and/or the native device driver then renders the data for display in the usual way, and provides the data to the buffers 520 of the Protocol Module 1000. The Protocol Module, operating with the xHC device driver 400, processes the data in accordance with the contents of the registers and the AV class protocol and also optimizes the data for transfer under the control of the xHCI controller, and provides the processed and formatted data to an accelerator buffer 610. The xHCI controller 540 then transfers the data from the accelerator buffer over the USB 190 to the USB video device 170 as USB messages in a known manner using the transfer rings 560.

The USB video device controller 244, after decoding the data in accordance with the headers and so forth, provides the processed received data to update the frame buffer 240 and the video device adapter 245, which operates in a known manner to direct the display of the updated data.

More specifically, the native video driver 480 on the computer 500 operates with the sematic model as if the driver is in communication with the traditional local frame buffer that would normally be attached via a very high-speed bus directly to the video display adapter. The native video driver thus sends updates for the frame buffer in the set of registers and buffers 520 as if the driver were communicating directly with a locally-attached display adapter.

The Protocol Module 1000 responds to the updates by the native device driver 480 to the video frame buffer 520, which is local to the computer 100 and accessible by the Protocol Module, by processing the updated data in accordance with the AV class protocol and the commands contained in the associated registers 520. The Protocol Module may thus emulate or utilize an actual graphical processing unit (GPU) to process the data. The Protocol Module then, at appropriate times, operates with the xHC device driver to optimize the processed updates for transfer over the USB 190 as messages. In particular, the Protocol Module generates all required AV Class commands, and formats the data appropriately.

Figure 8:
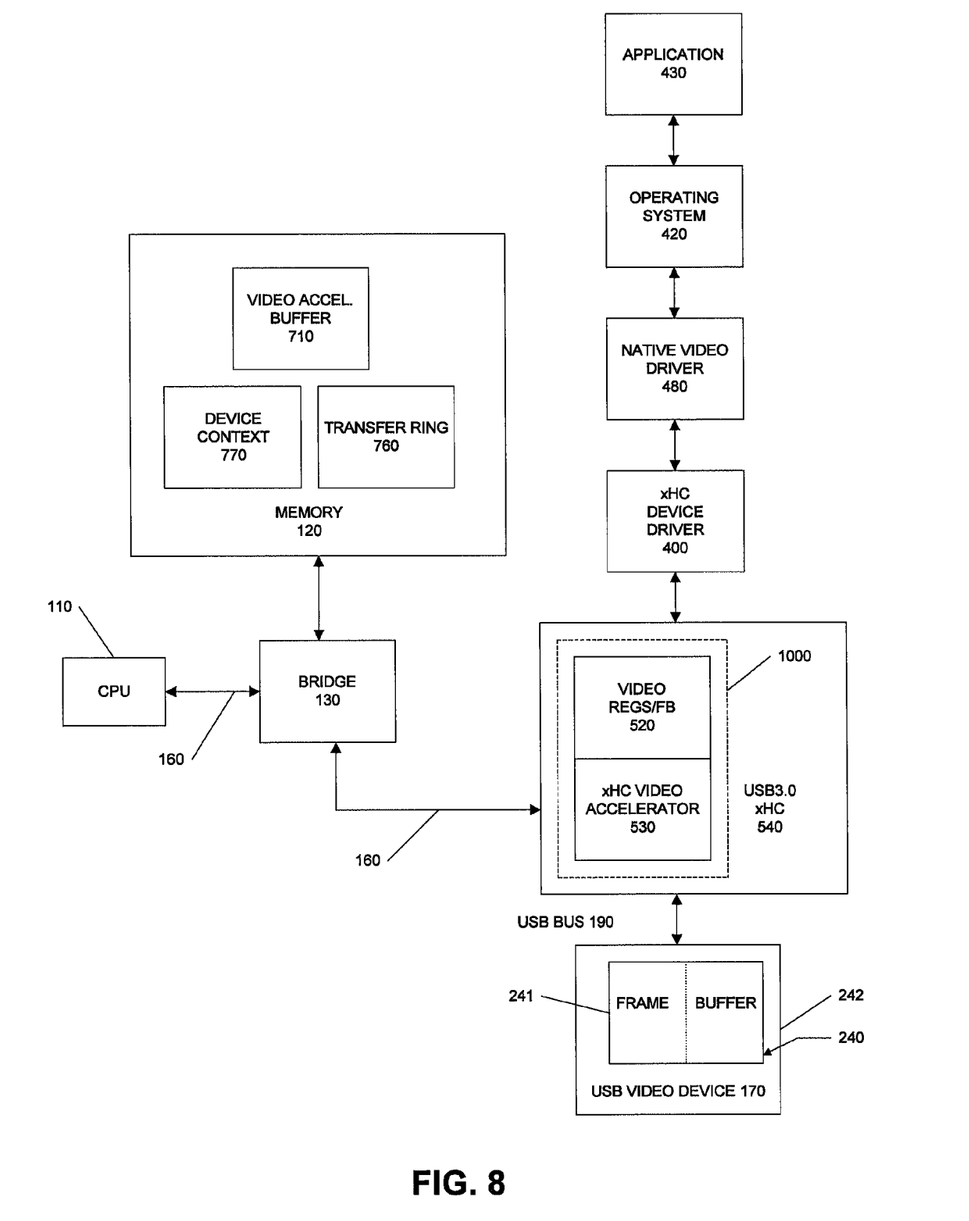
FIG. 8 is a functional block diagram showing an alternative arrangement of the system of FIG. 5.

The Protocol Module 1000 provides the processed data to the video acceleration buffer 610, which may be part of the accelerator 530 as shown or part of the host memory 120 (FIG. 8). The xHCI controller 540, utilizing the transfer rings 560 and device context 570, then transfers the data from the video accelerator buffer 610 to USB video device 170 over the USB 190 in a known manner. In an alternate embodiment, the commands are generated and the data processed on-the-fly by the Protocol Module, and the xHCI controller transfers the processed data from the local frame buffer 520 directly to the USB bus 190 using the transfer rings 560 and device content 570.

Upon receipt of the data transfer by the USB video device 170, the device controller 244 and the video display adaptor 245 operate to provide the processed update data to the frame buffer 240, as discussed above with reference to FIG. 3, and the device then operates in a known manner to ultimately display the associated images. Thus, no changes are made to the USB device 170 in order to achieve improved throughput. Rather, the improvement is due to the operations of the Protocol Module 1000, which operates in conjunction with the class protocols and as well as the xHCI protocol.

The xHCI controller 540 may instead operate with the Protocol Module 1000 to stream the updated processed data over the USB 190 to the attached device 170, since the USB 3.0 is fast enough for HDMI. For power management reasons, however, some amount of compression of static images may occur such that, for example, only the processed data representing the changes to the images are transferred.

Figure 6:
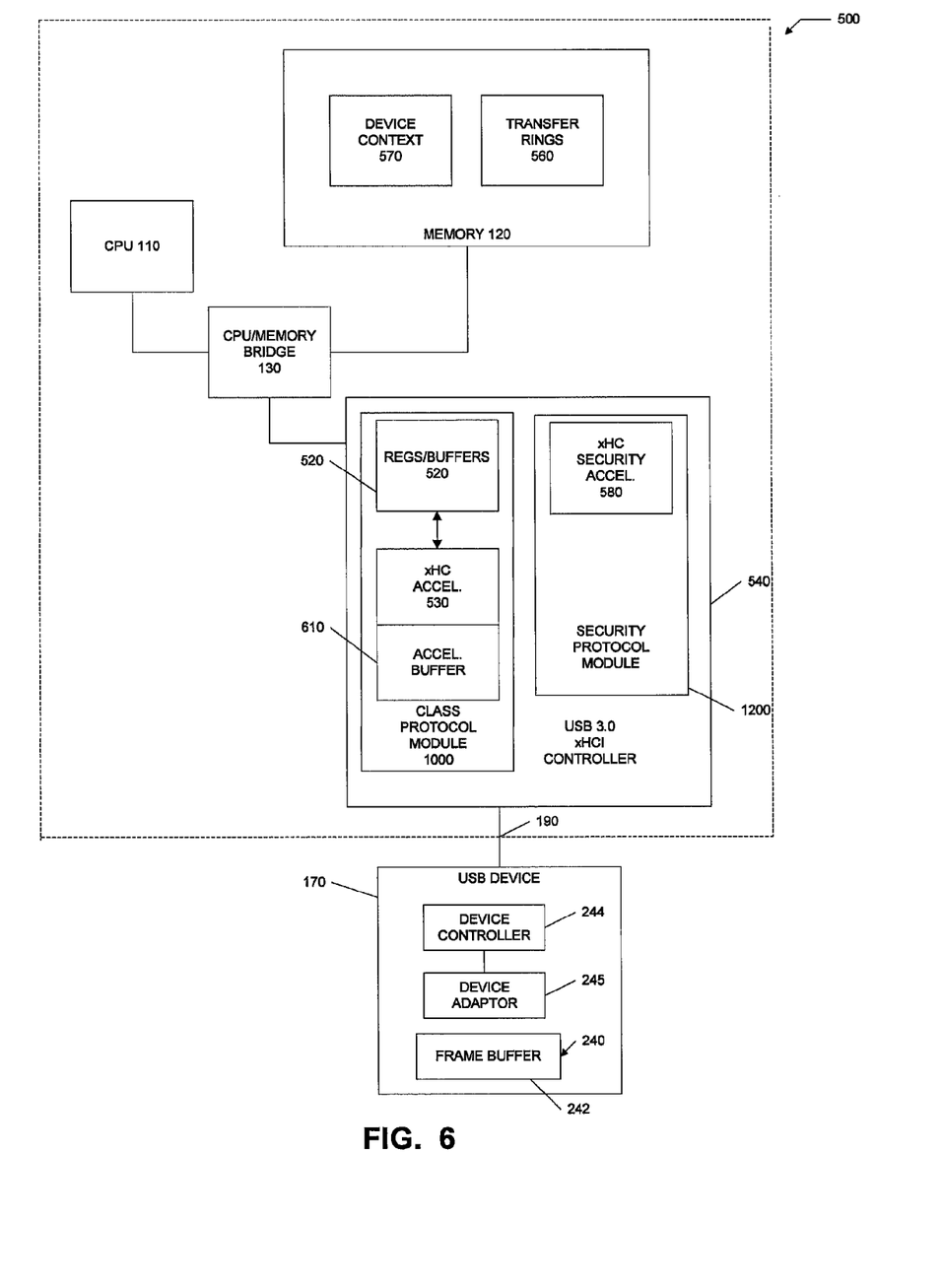
FIG. 6 is a functional block diagram of the system of FIG. 5 with additional protocol-aware modules.

Referring now to FIG. 6, the system may further include a Security Protocol Module 1200 for USB content security, to handle the encryption of the video content before passing the content onto the USB 190. The Protocol Module 1000 and the Security Protocol Module 1200 must interact and operate, from the point of view of the xHCI controller 540, as if the two modules reside on the same composite USB device, in order to satisfy the rules of the USB specification. The keys for content encryption are thus exchanged over a single set of endpoints that are established during enumeration of the USB device 170. Accordingly, the Content Security Protocol Module 1200, in the example, dynamically maintains keys and encrypts the video content after the Protocol Module 1000 has optimized the data for transfer. Once encrypted, the processed and formatted data are maintained in the acceleration buffer 610 and transmitted over the USB 190 to the video device 170 as messages as discussed above.

If a Protocol Module 1000 is not available to operate a given device, or if the system chooses not to use the Protocol Module 1000, the system operates in a conventional manner with the USB device, and uses the conventional USB class device drivers 410, xHC device drivers 400, transfer rings 220 and client buffers 210 as described above with reference to FIG. 2.

The Protocol Modules 1000 may support single functions of a multi-function device. For example, a composite multi-function device might combine networking and video functions. If the xHCI host controller 540 provides suitable (network class aware) Protocol Modules and (video class aware) Protocol Modules, then the system assigns the appropriate Protocol Modules to the network function and to the video function, and utilizes the corresponding end points associated with the respective functions for data transfer to and from the USB device 170, in the manner discussed above.

Each of the Protocol Modules provides a familiar register-like interface to the native class driver 480 or, as appropriate, network controller 150. The driver and/or controller then render the data for transfer through the interface as if the driver and/or controller is communicating with the device controller 244 and adaptor 245 of the connected device 170. For example, the network controller 150 provides frames for transfer through the interface. The Protocol Modules then process the data in accordance with the appropriate class protocols and the commands provided by the driver or controller to the interface registers, such that the processed data can be used in a usual manner by the receiving devices that are attached to the USB. For example, the Protocol Module operating with the network function emulates a PCIe network interface controller to process the frames and then formats the frames for transfer to the USB device 170 over the USB 190.

As discussed, the Protocol Module also operates with the xHC driver 400 to optimize the processed data for transfer by the xHCI controller 540. Other protocol modules may also interact with the video and/or network Protocol Modules to perform other protocol-specific functions before the data are sent over the USB 190 by the xHCI controller 540, such as the described security functions.

Figure 7:
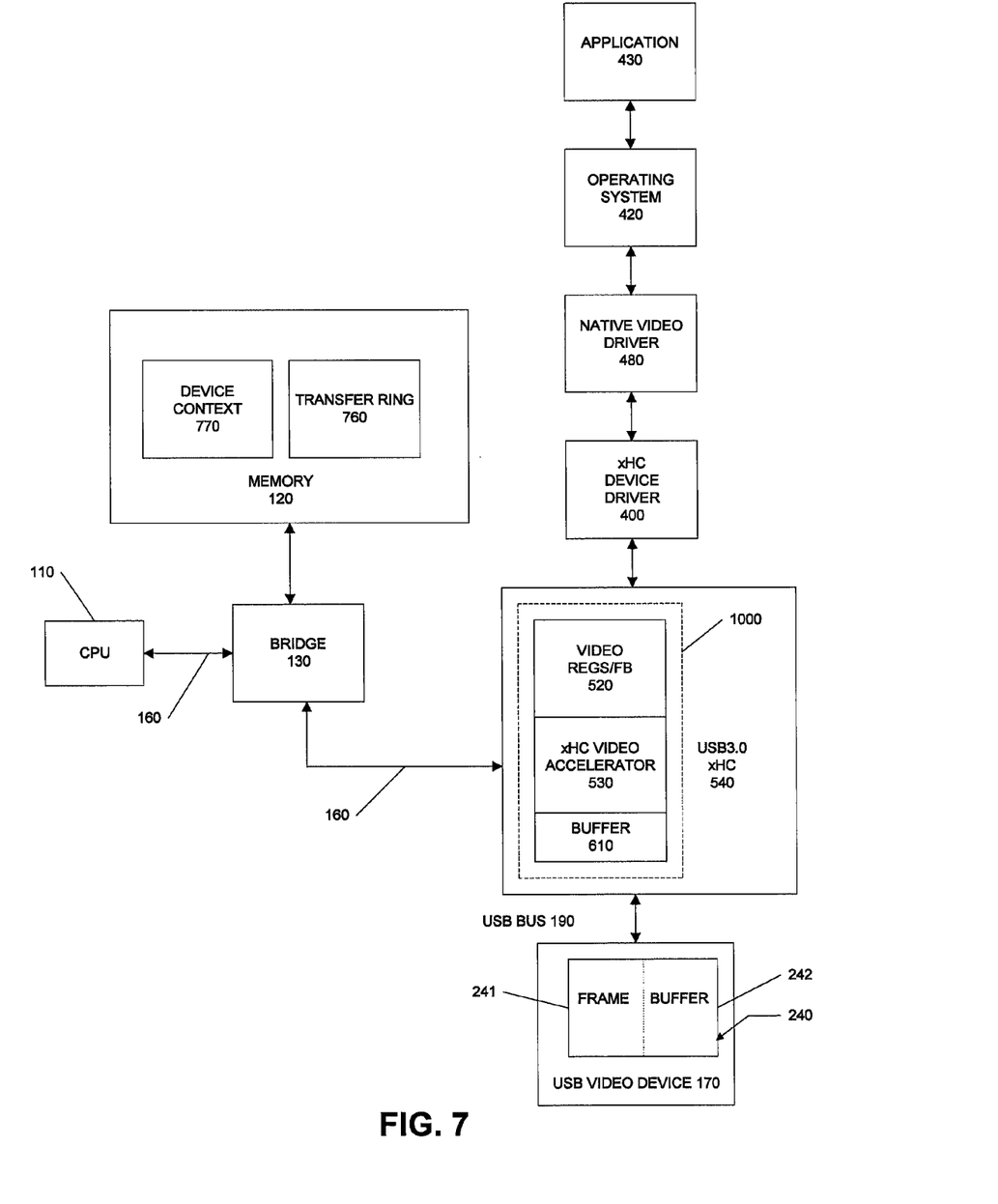
FIG. 7 is a functional block diagram showing the system of FIG. 5 in more detail.

The operation of the AV class Protocol Module 1000 is now discussed in more detail by way of example with reference to FIGS. 7 and 8. The frame buffer 240 on the video device 170 consists of two portions (namely, front and back portions 241, 242), which are used interchangeably to cleanly display a sequence of video images, also called fields or frames. When, for example, the front portion of the frame buffer is used by display hardware (not shown) for the image currently being scanned onto the display surface, the back portion is being updated with the pixel data for the next video field/frame to be displayed. The back portion is next used by the display hardware while the front portion is updated, and so forth.

At the end of the display of the current field/frame there is a period of time, called a Vertical Blanking Interval (VBI), when no new field/frame is being scanned onto the display surface. An application 430 typically waits for a VBI interrupt indication or request from the display controller of the video device to start updating the pixel data in the portion of the frame buffer that was just scanned onto the display surface. The application performs this update while the display hardware is scanning the other portion of the frame buffer onto the display surface. In this manner, the scanning process and the updating process do not interfere with each other.

The xHC accelerator 530 essentially efficiently translates video operations performed by the native video driver 480 into corresponding transactions made to the USB video device 170 over the USB 190. The data may be uncompressed pixel data or compressed pixel data. In the example, the data are uncompressed.

During enumeration, the USB video device 170 is provided with three USB endpoints, namely a control-bulk-out, which is used to request control operations of the device; a control-bulk-in, which is used by the USB video device 170 to provide responses to the control operations; and a stream-out, which is used to send pixel data from the host 500 to the USB video device frame buffer 240.

The native video driver 480 accesses the accelerator video registers 520 to set the memory address for the front and back portions 241, 242 of the frame buffer 240 and also set the dimensions and pixel data formats of the front and back frame buffer portions. The register accesses that set the dimensions and pixel data format do not cause transactions to the USB video device 170 control-bulk-out endpoint. Rather, the register values are used later when sending pixel data to the USB video device 170 using the stream-out endpoint.

The xHC video accelerator 530 independently generates an early VBI interrupt request to indicate to the native video driver 480 an end of the current field/frame display scan. The accelerator generated interrupt request occurs before than the actual VBI occurs at the video display device, and may, for example, occur up to one field/frame earlier. The native video driver responds to the early VBI by updating the data in the local version 520 of the frame buffer. The updated data are then available to the accelerator for further manipulation and encapsulation. The accelerator manipulates the updated data and also optimizes, or formats, the data for transport over the USB 190, and provides the processed and optimized data to the accelerator video buffer 610 such that the data are ready to be sent over the USB 190 in response to the video device sending, over the control bulk in endpoint, an actual VBI interrupt request. The xHCI controller 540 then transmits the data from the video accelerator buffer 610 to the USB video device 170 in a series of USB transactions over the USB Bus 190. Accordingly, the data transfer occurs, without an associated processing delay, during the VBI at the video device 170.

The xHC video accelerator 530 continues generating the early VBI interrupt requests and the native driver 480 updates the frame buffer 520 in response. The accelerator also continues to process and format the data and provide the results to the video accelerator buffer 610 for transmission under the control of the xHCI controller 540. The USB video device 170 also continues to generate the actual VBI interrupt requests based on its local display controller, and the actual VBI interrupt requests are transported over USB 190 via the control-bulk-in endpoint. The device generated VBI interrupt signals to the xHCI host controller 540 that the data are to be transferred from the buffer 610 over the USB 190.

The USB transactions are processed according to the USB Video device class definition determined using the pixel data format set previously in the video registers 520. The USB Video device class definition has a pixel data header that describes a block of pixel data followed by the pixel data information. The pixel data header consists of: a frame buffer layout format code value (e.g. 2d vs. 3d), a color format code value (e.g. rgb8, rgb16, etc.), origin (x,y) information for the local frame buffer location of the pixel data, and dimension (w, h) information for the pixel data.

The xHC video accelerator 530 thus uses the starting memory address for the front portion 241 of the frame buffer 240 and the dimensions of the front portion of the frame buffer as set previously in the video registers 520 to read the updated pixel data from the frame buffer 520 and generate corresponding pixel data format header and pixel data in the USB transactions to the USB video device 170 over USB 190. When the USB video device 170 receives the pixel data format header and the pixel data, the device writes the updated pixel data into the frame buffer 240 based on the header information and the video device display adapter (not shown) operates in a known manner to display the pixel data as a next frame. As appropriate, commands to the device 170 may be similarly formatted by the Protocol Modules and sent as USB messages to the devices.

An xHC Security Accelerator 580, which is another portion of the xHCI host controller 540 and part of a Security Protocol Module 1200, may similarly accelerate Content Security protocol processing. Thus, the data are first processed by the xHC video accelerator 530, then the data are encrypted by the Security Accelerator 580 and held in the video accelerator buffer 610 for transfer over the USB 190.

The Protocol Modules 1000 need not change operations based on differences in the operations of the USB video devices, since the protocol modules operate with the contents of the model frame buffer that have been updated based on the information provided to the model video registers 520 by the native device driver 480. Thus, the Protocol Modules eliminate the need for video class USB drivers 410 that are specific to the respective operations of the various types of USB video devices 170. Instead, at the designer's option, any register-based video controller can be emulated by the Protocol Module, allowing immediate use of legacy software.

The Protocol Modules 1000 and 1200 may be used with other message-oriented serial busses, such as MIPI. In addition, the Protocol Modules may be designed as dedicated hardware, in which case each Protocol Module might only be able to support a fixed number of device instances, where the upper limit is predetermined. Alternatively or in addition, certain or all of the Protocol Modules may be designed as shared hardware, in which case each Protocol Module can support an indefinite number of device instances in the same class, as limited by system resources. The Protocol Module discovery process allows for both kinds of implementations.

In a Virtual Machine ("VM") environment, physical host controllers attached to the physical VM host are presented in virtual form to the guest machines. In this case, Protocol Modules 1000 physically present in the physical xHCI host controller 540 may be managed by the physical host and hidden from the guest machines. The Protocol Modules may be reported to the guest machines and used exclusively by a guest machine or shared where appropriate. Alternatively, virtual Protocol Modules may be simulated for each guest machine, in which case the Protocol Modules may be connected to the host operating system and/or the host physical xHCI host controller. The use of virtual Protocol Modules is especially attractive, because it allows a level of virtual encapslation/decapsulation to be skipped for networking device classes. Thus, network protocol data units are simply moved through the virtual Protocol Module between guest operating system and host operating system.

The Protocol Modules can also be useful in a virtual environment, even if there are no physical host controllers or devices, because the Protocol Modules simplify the connection and routing of information between the guest and host operating systems.

The Protocol Modules may be used for transferring data to various storage devices attached to the USB 190. The Protocol Modules may, for example, provide a familiar interface for data transfer of SCSI and/or bulk only transfer (BOT) storage devices. The Protocol Modules then emulate a SATA disk controller and process the data for transfer over the USB 190 in accordance with UAS and/or BOT over USB protocols that are supported by the attached storage devices.

In addition, the Protocol Modules may provide a familiar interface for and emulate an I2S controller, to provide processed audio data for transfer over the USB to an attached audio device. The Protocol Modules 1000 and Security Protocol Modules 1200 may consist of one or more processors that are configured to perform the operations of the xHC accelerators 530 and the xHC security accelerators 580. The Protocol Modules may be implemented in firmware, software, hardware or any combination thereof.

What is claimed is:

1. A Universal Serial Bus (USB) class aware protocol module operating with an xHCI controller to transfer data in a memory to a device attached to a USB, the protocol module comprising:
   a set of registers and buffers including one or more registers and one or more buffers, the set modeling an interface for transfer of the data over a register oriented bus to the device, the set of registers and buffers receiving commands associated with the transfer of the data to the device; and
   one or more processors configured to
      process the data contained in the set of registers and buffers in accordance with the commands and a USB class protocol corresponding to the device to produce processed data,
      optimize the processed data for transfer over the USB to the device by the xHCI controller, and
      in response to an interrupt received over the USB from the device, transfer the processed data over the USB to the device under control of the xHCI controller, wherein access to the registers of the set of registers and buffers does not cause a multiple of transfers over the USB to the device.

2. The protocol module of claim 1 wherein the one or more processors optimize the processed data by formatting the data as messages for transfer over the USB in accordance with an xHC protocol.

3. The protocol module of claim 1, wherein the one or more processors operate with an xHC driver to format the data.

4. The protocol module of claim 1 wherein the device is a video device, and
   the one or more processors process the data and commands contained in the set of registers and buffers by emulating a video device controller operating a graphical processing unit.

5. The protocol module of claim 4 wherein the one or more processors determine which data are updated in the set of registers and buffers and process the updated data for transfer to the video device over the USB.

6. The protocol module of claim 1 wherein
   the device is a network device, and
   the one or more processors emulate a PCIe network interface controller.

7. The protocol module of claim 1 wherein
   the device is a storage device, and
   the one or more processors emulate a storage device interface controller and process the data in accordance with a UAS protocol, a bulk only transfer protocol or both.

8. The protocol module of claim 7 wherein
   the device is a disk drive, and
   the processors emulate a SATA disk controller.

9. The protocol module of claim 1 wherein
   the device is an audio device, and
   the one or more processors emulate an audio device controller and process the data in accordance with an I2S protocol.

10. The protocol module of claim 1 wherein the interrupt is a first vertical blanking interrupt from the device, and wherein the processing of the data contained in the set of registers and buffers in accordance with the commands occurs in response to a second vertical blanking interrupt generated by the xHCI controller.

11. The protocol module of claim 10 wherein the second vertical blanking interrupt is generated early to indicate an end of a scan of the memory.

12. A system for transferring data from a host to an attached device over a Universal Serial Bus (USB), the system including:
   an xHCI controller that controls the transferring of the data over the USB as one or more USB messages in accordance with an xHC protocol;
   a device driver that provides commands and data for transfer over a register based bus;
   a protocol module that operates with the xHCI controller and produces data that are processed and optimized for transfer over the USB under control of a host interface controller, the protocol module including
      a set of registers and buffers including one or more registers and one or more buffers, the set modeling an interface for data transfer over the register based bus to the device, the set of registers and buffers receiving commands associated with transfers of the data to the device; and
      one or more processors configured to
         in response to a first interrupt process the data contained in the set of registers and buffers in accordance with the commands and a USB class protocol corresponding to the device and produce processed data, and
         in response to a second interrupt received over the USB from the device, transfer the data over the USB to the device by the xHCI controller, wherein access to the registers does not cause a multiple of transfers over the USB to the device.

13. The system of claim 12 further including a security protocol module that further processes the data for transfer by encrypting the processed data, the security protocol module and the protocol module operating to exchange keys for encryption over a single set of endpoints that is established during enumeration of the device by the host interface controller.

14. A method of transferring data in a memory over a Universal Serial Bus (USB) including
   associating a class aware protocol module with a device instance during enumeration of the device by a USB host interface controller;
   providing a set of registers and buffers to emulate an interface to the device over a register based bus;
   providing to the set of registers and buffers commands and data for transfer to the device;

processing using one or more processors configured to process the commands and data contained in the set of registers and buffers in accordance with a USB protocol corresponding to the device to produce processed data;

optimizing the processed data for transfer over the USB to the device in accordance with an xHCI protocol; and in response to an interrupt received from the device over the USB, transferring the optimized data to the device over the USB as messages over pipes established during the enumeration of the device under control of an xHCI controller, wherein access to the registers does not cause a multiple of transfers over the USB to the device.

15. The method of claim 14 further including providing transfer rings to direct the optimized data to the USB bus.

16. The method of claim 15 further including transferring selected or all of the commands to the device over the USB as messages using the transfer rings.

17. The method of claim 14 wherein the processing emulates a controller for the device.

18. The method of claim 17 wherein the processing emulates a video device controller.

19. The method of claim 18 wherein the processing further emulates a graphical user interface.

20. The method of claim 17 wherein the processing emulates a disk controller operating in accordance with UAS protocols, bulk only transfer protocols or both.

* * * * *